United States Patent
Bechadergue et al.

(10) Patent No.: US 12,267,107 B2
(45) Date of Patent: Apr. 1, 2025

(54) FACE DETECTION AND OPTICAL WIRELESS COMMUNICATION MODULE

(71) Applicant: OLEDCOMM, Vélizy Villacoublay (FR)

(72) Inventors: Bastien Bechadergue, Malakoff (FR); Carlos Dominguez-Gonzalez, Sèvres (FR); Clément Lartigue, Clamart (FR); Benjamin Azoulay, Paris (FR)

(73) Assignee: OLEDCOMM, Vélizy Villacoublay (FR)

( * ) Notice: Subject to any disclaimer, the term of this patent is extended or adjusted under 35 U.S.C. 154(b) by 678 days.

(21) Appl. No.: 17/619,132

(22) PCT Filed: Jun. 16, 2020

(86) PCT No.: PCT/EP2020/066623
§ 371 (c)(1),
(2) Date: Dec. 14, 2021

(87) PCT Pub. No.: WO2020/254321
PCT Pub. Date: Dec. 24, 2020

(65) Prior Publication Data
US 2022/0358785 A1 Nov. 10, 2022

(30) Foreign Application Priority Data
Jun. 19, 2019 (FR) ...................................... 1906600

(51) Int. Cl.
*H04B 10/114* (2013.01)
*G06V 10/143* (2022.01)
*G06V 40/16* (2022.01)

(52) U.S. Cl.
CPC ....... *H04B 10/1143* (2013.01); *G06V 10/143* (2022.01); *G06V 40/166* (2022.01); *G06V 40/172* (2022.01)

(58) Field of Classification Search
CPC .............. H04B 10/1143; G06V 10/143; G06V 10/166; G06V 40/172
See application file for complete search history.

(56) References Cited

U.S. PATENT DOCUMENTS

| 9,524,421 B2 | 12/2016 | Ross et al. |
| 2005/0265731 A1* | 12/2005 | Keum .................. H04B 10/114 398/183 |

(Continued)

FOREIGN PATENT DOCUMENTS

| WO | WO 2018/063486 A1 | 4/2018 |
| WO | WO 2019/034838 A1 | 2/2019 |

OTHER PUBLICATIONS

International Search Report as issued in International Patent Application No. PCT/EP2020/066623, dated Sep. 11, 2020.

*Primary Examiner* — Ping Y Hsieh
*Assistant Examiner* — Jose M Torres
(74) *Attorney, Agent, or Firm* — Pillsbury Winthrop Shaw Pittman LLP (57) ABSTRACT

A detection and communication module arranged to implement a face detection function and an optical wireless communication function, and including a processing unit, a transmission chain and a reception chain, the processing unit being arranged to transmit via the transmission chain a detection signal, to receive via the reception chain the detection signal following its reflection on a face surface of an individual, and to evaluate a distance between the detection and communication module and the face surface of the individual, the processing unit being further arranged to transmit via the transmission chain a transmitted optical wireless communication signal containing data to be transmitted, and to receive via the reception chain a received optical wireless communication signal.

14 Claims, 4 Drawing Sheets

(56) References Cited

U.S. PATENT DOCUMENTS

| | | | |
|---|---|---|---|
| 2007/0147843 A1* | 6/2007 | Fujiwara | H04B 10/116 |
| | | | 398/118 |
| 2015/0071648 A1 | 3/2015 | Hong et al. | |
| 2017/0124421 A1* | 5/2017 | Van Eeuwijk | H04N 23/56 |
| 2018/0302159 A1* | 10/2018 | Ritchie | H04B 10/1143 |
| 2019/0132000 A1* | 5/2019 | Kim | H04B 10/116 |
| 2019/0213309 A1* | 7/2019 | Morestin | G01S 17/04 |
| 2019/0386744 A1* | 12/2019 | Plank | H04B 10/07953 |
| 2020/0049989 A1* | 2/2020 | Brown | G02B 27/017 |
| 2020/0366372 A1* | 11/2020 | Tsonev | H04B 10/116 |

\* cited by examiner

FACE DETECTION AND OPTICAL WIRELESS COMMUNICATION MODULE

CROSS-REFERENCE TO RELATED APPLICATIONS

This application is the U.S. National Stage of PCT/EP2020/066623, filed Jun. 16, 2020, which in turn claims priority to French patent application number 1906600 filed Jun. 19, 2019. The content of these applications are incorporated herein by reference in their entireties.

The invention relates to the fields of facial recognition, eye protection and optical wireless communication.

BACKGROUND OF THE INVENTION

Today, we are witnessing the development of numerous applications that use optical wireless communication (OWC) technology.

These applications are both one-way and two-way applications.

One-way applications include, for example, lamps installed in museums, train stations, airports or stores, which transmit geo-contextualized information to visitors, travelers and customers. There are also street lamps that transmit measurements made by sensors integrated in these street lamps. There are also geolocation devices.

Examples of bidirectional applications include peer-to-peer (P2P) data transmission systems between two devices, or systems for connecting a device to a LiFi (Light Fidelity) network via a LiFi access point.

Optical wireless communication has many advantages over traditional radio frequency communication. We can mention for example the high speed that it allows to reach, the availability of the bandwidth, the reduction of the risks related to the electromagnetic waves, the reduction of the risks of piracy, etc.

Optical wireless communication is therefore a particularly promising technology in many industrial fields.

One of the challenges faced by designers of solutions based on optical wireless communication is to successfully integrate this technology at low cost and low volume in various systems, for example in smartphones or tablets.

OBJECT OF THE INVENTION

A purpose of the invention is to improve the integration of functions using optical wireless communication

SUMMARY OF THE INVENTION

In order to achieve this goal, a detection and communication module is proposed which is arranged to implement a face detection function and an optical wireless communication function, and which comprises a processing unit, a transmission chain comprising a transmission analog front-end circuit and a light source, and a reception chain comprising a reception analog front-end circuit and a photoreceiver,
  the processing unit being arranged to transmit a detection signal via the transmission chain, to receive the detection signal via the reception chain following its reflection on a surface of an individual's face, to measure a time of flight of the detection signal, and to evaluate a distance between the detection and communication module and the surface of the individual's face, the processing unit being further arranged to transmit via the transmission chain a transmitted optical wireless communication signal containing data to be transmitted, and to receive via the reception channel a received optical wireless communication signal.

The detection and communication module according to the invention enables both a face detection function and an optical wireless communication function to be implemented. The face detection function can be a facial recognition function or an eye protection function. Both functions use the same transmission chain and the same reception chain. Thus, using the detection and communication module according to the invention, two functions are implemented using the same hardware resources. In this way, these two functions are integrated at a reduced cost and in a reduced volume, which is very advantageous, in particular for equipment such as smartphones or tablets in which the available space is extremely limited.

Further, a detection and communication module such as the one just described is proposed, wherein the face detection function is a facial recognition function.

Further proposed is a detection and communication module such as the one just described, wherein the face detection function is an eye protection function, and wherein the processing unit is arranged to interrupt the transmission of the transmitted optical wireless communication signal when the distance between the detection and communication module and the surface of the individual's face is below a predefined threshold.

It is further proposed a detection and communication module such as the one just described, in which the detection signal and the transmitted optical wireless communication signal are included in a single mixed signal.

A detection and communication module such as the one just described is also proposed, in which the mixed signal comprises packets each comprising a detection frame, a communication preamble and a communication frame comprising the data to be transmitted.

Furthermore, a detection and communication module such as the one just described is proposed, in which the detection frame comprises a binary signal with a high autocorrelation.

Furthermore, a detection and communication module such as the one just described is proposed, in which the binary signal comprises a pseudo-random noise code.

A detection and communication module as described above is further proposed, wherein the optical wireless communication function is used to define the pseudo-random noise code assigned to the detection and communication module.

In addition, a detection and communication module such as the one just described is proposed, in which the detection frame integrates timestamp data allowing to calculate a transmission time of the mixed signal.

It is also proposed a detection and communication module such as the one just described, wherein the transmission analog front-end circuit and the reception analog front-end circuit are integrated in the same electronic component.

A detection and communication module such as the one just described is also proposed, wherein the detection and communication module is integrated in a single optoelectronic component.

A detection and communication module such as the one just described is also proposed, comprising in addition an optical transmission device at the output of the transmission chain.

Further proposed is a detection and communication module such as the one just described, wherein the optical transmission device comprises a first converging lens or a diverging lens or a first freeform lens.

In addition, a detection and communication module such as the one just described is proposed, also comprising an optical reception device at the input of the reception chain.

Furthermore, a detection and communication module such as the one described above is proposed, wherein the optical reception device comprises a second converging lens or a second freeform lens or an optical concentrator.

Further proposed is a detection and communication module such as the one just described, wherein the light source comprises a LED or a resonant cavity LED or a vertical cavity laser diode emitting through the surface.

Further proposed is a detection and communication module as just described, wherein the photoreceptor comprises a PIN photodiode or an avalanche photodiode or a single photon avalanche diode.

We also propose an equipment in which is integrated a detection and communication module such as the one just described.

It is also proposed an equipment such as the one just described, wherein the equipment is a smartphone or a tablet.

The invention will be better understood in the light of the following description of a particular non-limiting embodiment of the invention.

BRIEF DESCRIPTION OF THE DRAWINGS

Reference will be made to the attached drawings, including.

DETAILED DESCRIPTION OF THE INVENTION

The invention is described here by implementing it in particular applications which, of course, are not limiting.

Figure 1:
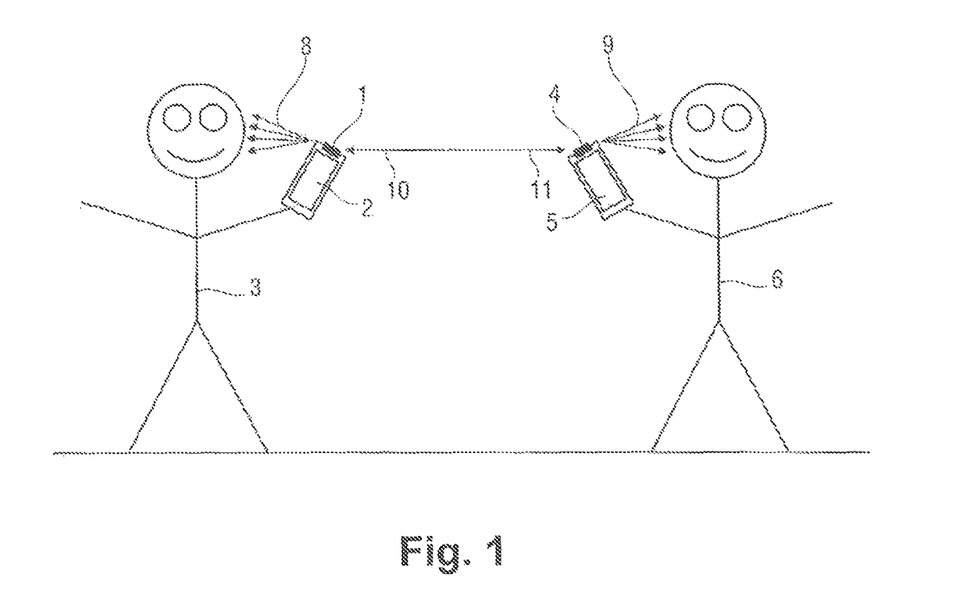
FIG. 1 represents two individuals each equipped with a smartphone fitted with a detection and communication module according to the invention.

With reference to FIG. 1, the detection and communication module 1 according to a first embodiment is here integrated in a smartphone 2 with which an individual 3 is equipped. Another detection and communication module 4, similar to the detection and communication module 1, is also integrated in a smartphone 5 with which another individual 6 is equipped.

The detection and communication module 1 (as well as the detection and communication module 4) is used to implement, separately or simultaneously, a face detection function and an optical wireless communication function. The face detection function is here a three-dimensional face recognition function.

The facial recognition function performs facial recognition of the individual 3 by sending detection light beams 8 directed towards the face of the individual 3. Here, the detection light beams 8 are infrared beams. The detection light beams 8 are reflected by the surfaces of the face of the individual 3 and the echoes thus produced are detected by the detection and communication module 1, which then measures its distance with respect to the various surfaces of the face of the individual 3, which makes it possible to reconstruct the face of the individual 3 in three dimensions. The reconstructed face thus obtained is then compared with a reference face stored in the smartphone 2 to perform facial recognition of the individual 3.

Similarly, the detection and communication module 4 sends detection light beams 9 to perform facial recognition of the individual 6.

The detection and communication module 1 of the smartphone 2 of individual 3 also sends communication light beams 10, containing communication data, to the detection and communication module 4 of the smartphone 5 of individual 6. The communication light beams 10 are here infrared beams. The communication data is transmitted to the individual 6 and a peer-to-peer optical wireless communication is established between the individual 3 and the individual 6. Of course, symmetrically, the detection and communication module 4 of the smartphone 5 of the individual 6 may also send communication light beams 11 to transmit communication data to the detection and communication module 1 of the smartphone 2 of the individual 3. The communication is thus a two-way communication. The communication data is any data containing for example a multimedia file.

The detection and communication module according to the invention 1 is now described in more detail. The detection and communication module 4 is identical to the detection and communication module 1.

Figure 2:
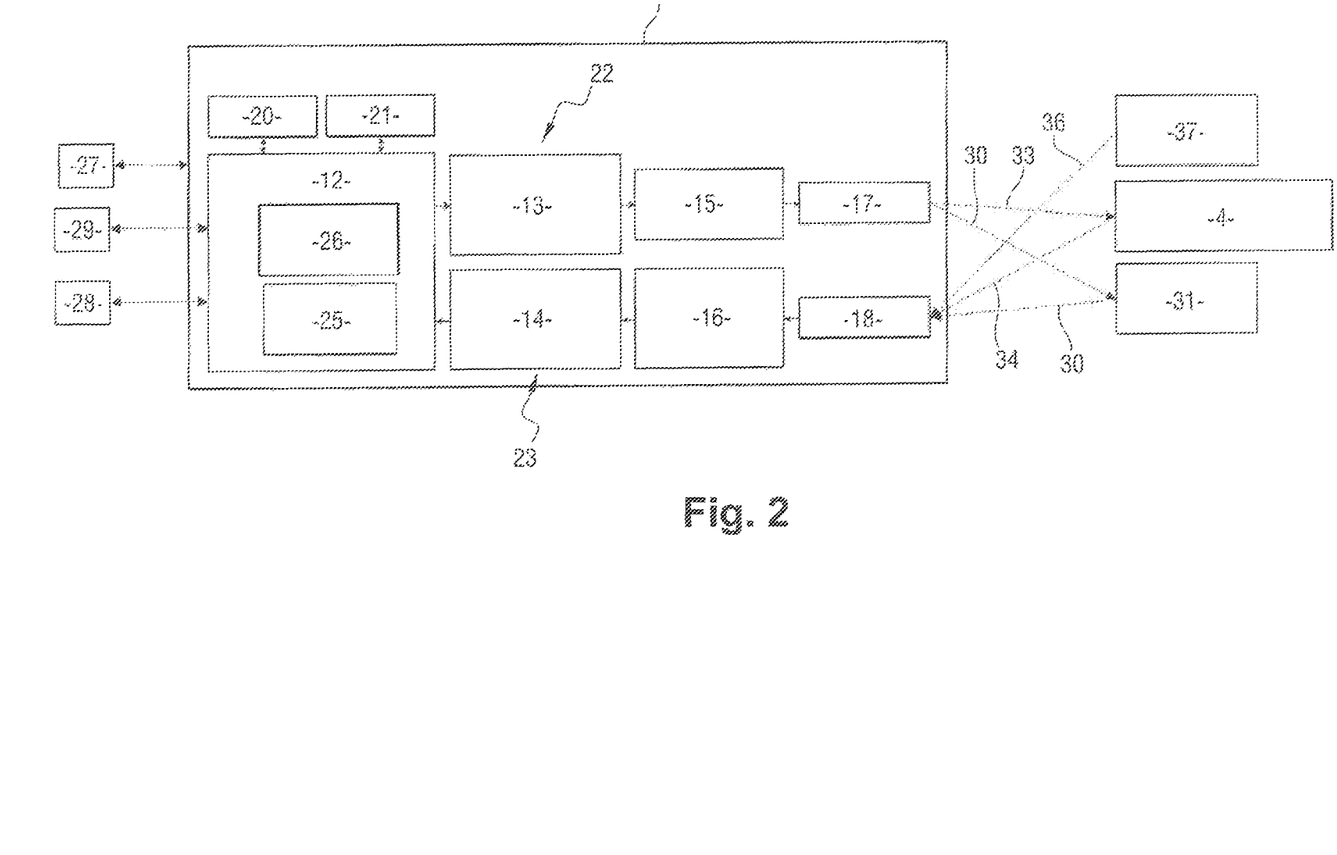
FIG. 2 shows a detection and communication module according to the invention.

With reference to FIG. 2, the detection and communication module 1 comprises a processing unit 12, a transmission analog front-end circuit 13 (here referred to as "transmitting AFE"), a reception analog front-end circuit 14 (here referred to as "receiving AFE"), a light source, in this case a light emitting diode 15 (LED), a photoreceiver, in this case a PIN photodiode 16.

The detection and communication module 1 also comprises a transmission optical device, in this case a diverging lens 17, and a reception optical device, in this case a converging lens 18.

The detection and communication module 1 is integrated into a single optoelectronic component. The transmitting AFE 13 and the receiving AFE 14 are integrated in the same electronic component.

The sensing and communication module 1 also includes a read-only memory 20 and a random-access memory 21 that are connected to the processing unit 12.

The processing unit 12, the emitting AFE 13, the LED 15 and the diverging lens 17 form a transmission chain 22 and are connected in series, in this order, from upstream to downstream (i.e., from the processing unit 12 to the optical output of the detection and communication module 1).

Similarly, the processing unit 12, the receiving AFE 14, the PIN photodiode 16 and the converging lens 18 form a reception chain 23 and are connected in series, in this order, from upstream to downstream.

The processing unit 12 here includes a microcontroller, but could just as easily include one or more other processing components, such as an FPGA, ASIC, processor, etc.

The processing unit 12 includes a detection module 25 and a communication modem 26 which are programmed in the microcontroller: the detection module 25 and the communication modem 26 are here software modules but could be hardware modules or a software-hardware mix.

The detection and communication module 1 is connected to an electrical power source 27 for its power supply. The processing unit 12 is connected to a detection data bus 28 and to a communication data bus 29.

The sensing data bus 28 and the communication data bus 29 can be, for example, USB, I2C, I3C, PCL-E, Ethernet, RGMII, SGMII, etc.

The detection and communication module 1 is arranged to implement, separately or simultaneously, the optical wireless communication function and the facial recognition function.

The detection and communication module 1 can therefore operate in three modes.

In a first operating mode, the detection and communication module 1 implements the facial recognition function, with the optical wireless communication function disabled.

In a second mode of operation, the detection and communication module 1 implements the optical wireless communication function, with the facial recognition function disabled.

In a third mode of operation, the detection and communication module 1 simultaneously implements the facial recognition function and the optical wireless communication function.

In the first mode of operation, the detection module 25 of the processing unit 12 acquires parameterization data transmitted via the detection data bus 28. In this case, the parameterization data comes from the smartphone 2.

The detection module 25 then periodically generates a detection signal which is a digital signal. The detection signal is a train of short duration pulses (typically less than a few tens of nanoseconds).

The detection module 25 transmits the detection signal via the transmission chain 22.

The detection module 25 transmits the detection signal to the transmitting AFE 13. Transmitting AFE 13 converts the detection signal into a first analog output electrical signal matched to LED 15. The LED 15 then emits a set of detection light beams 30 through the diverging lens 17.

The detection light beams 30 are projected towards a reflective surface which in this case is a surface of the face 31 of the individual 3 in possession of the smartphone 2. The detection light beams 30 are then reflected by the face 31 and then received by the receiving chain 23.

The PIN photodiode 16 picks up the detection light beams 30 after their reflection via the converging lens 18 which focuses the detection light beams 30 on the PIN photodiode 16.

The PIN photodiode 16 then produces a first received analog electrical signal which is transformed by the receiving AFE 14 into a digital signal suitable to be acquired by the detection module 25 of the processing unit 12.

The detection module 25 then measures a time of flight of the detection signal and then evaluates from the time of flight a distance between the detection and communication module 1 and the surface of the face 31 of individual 3.

Figure 3:
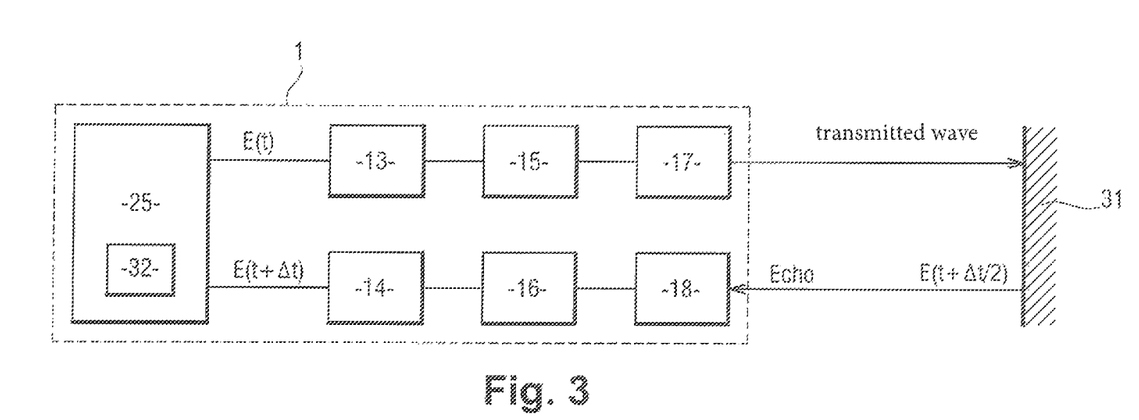
FIG. 3 represents the implementation of a distance measurement by the detection and communication module according to the invention.

With reference to FIG. 3, distance assessment by time-of-flight measurement involves measuring the time elapsed between the transmission of the detection signal E(t) by the detection module 25 (via the transmitting AFE 13, LED 15, and diverging lens 17), and the reception by the detection module 25 of the echo E(t+Δt) reflected from the face 31 (via the converging lens 18, PIN photodiode 16, and receiving AFE 14). The time of flight is measured by a counter 32 implemented in the detection module 25.

The time of flight Δt is proportional to the ratio between the distance D between the detection and communication module 1 and the reflecting surface (the surface of face 31), and between the celerity c of light, according to the relationship:

$$\Delta t = 2D/c.$$

In the second mode of operation, the detection and communication module 1 is used to implement the optical wireless communication function.

The processing unit 12 acquires on the communication data bus 29 communication data to be transmitted to the smartphone 5 of the individual 6. The communication modem 26 of the processing unit 12 formats the communication data and produces a transmitted optical wireless communication signal, which is a digital signal containing the communication data. The shaping is primarily encoding and modulation of the data. The transmitting AFE 13 acquires the transmitted optical wireless communication signal and converts it into a second transmitted analog electrical signal matched to the LED 15. The LED 15 then transmits a set of communication light beams 33 through the diverging lens 17.

The communication light beams 33 then propagate in free space and are received by the detection and communication module 4 of the smartphone 5 of individual 6. The detection and communication module 4 thus acquires the communication data.

Similarly, when the detection and communication module transmits communication data to the detection and communication module 1, the detection and communication module 1 receives communication light beams 34 via the converging lens 18 and then the PIN photodiode 16. The PIN photodiode 16 then produces a second received analog electrical signal which is transformed by the receiving AFE 14 into a received optical wireless communication signal which is a digital signal suitable for acquisition by the communication modem 26 of the processing unit 12.

The communication modem 26 demodulates and decodes the received communication data.

It is noted that beams 36 from ambient light 37 can be collected by the detection and communication module 1 and thus generate interference.

The effect of these interferences is limited or even cancelled thanks to an optical filtering carried out by the converging lens 18, thanks to an analog filtering carried out in the receiving AFE 14, and thanks to a digital filtering carried out in the communication modem 26 of the processing unit 12.

In the third mode of operation, the processing unit 12 acquires both parameterization data transmitted via the detection data bus 28, and communication data transmitted via the communication data bus 29.

A single mixed signal is generated by the processing unit 12 from the parameterization data and the communication data. The detection signal and the transmitted optical wireless communication signal are included in the mixed signal. The mixed signal is then transmitted via global light beams produced by the transmission chain 22, as described earlier.

Figure 4:
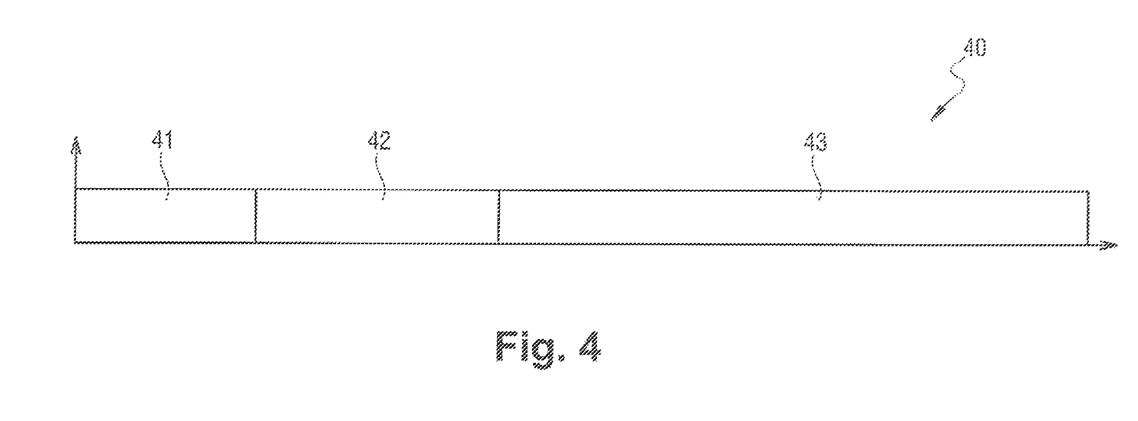
FIG. 4 represents the structure of a mixed signal packet used to implement both a facial recognition function and an optical wireless communication function.

The mixed signal is formed of packets similar to the packet 40 visible in FIG. 4. Packet 40 includes a detection frame 41, followed by a communication preamble 42 and then a communication frame 43.

The detection frame 41 contains a signal that is useful for facial recognition. This is a binary signal with high auto-correlation, in this case a pseudo-random noise (PN) code. The useful signal could include a different signal, for example a Barker sequence.

The PN code is unique and specific to each detection and communication module. As the number of PN codes is not infinite, it can be foreseen that optical wireless communication can be used initially to define the PN code used by each detection and communication module of the equipments connected in a network.

The communication preamble 42 contains information about the characteristics of the optical wireless communication.

The communication frame 43 contains the data to be transmitted, in this case the communication data from the communication bus 29, which has been encoded and modulated.

The overall light beams therefore contain a first portion of beams that will be reflected by the reflective surfaces of the face and form the detection light beams, and a second portion of beams that is received by the detection and communication module 4 of the smartphone 5 of individual 6 and forms the communication light beams.

The first beam portion is received by the detection and communication module 1 after its reflection. Only the detection frame 41 is considered, ignoring the communication preamble 42 and the communication frame 43. Since the detection frame 41 has high autocorrelation, the detection and communication module 1 effectively identifies the reflected detection frame 41 corresponding to the transmitted detection frame 41.

The second beam portion is received by the detection and communication module 4 and is processed, demodulated and decoded as previously described. The communication preamble 42 and the communication frame 43 are taken into account, ignoring the detection frame 41.

Alternatively, the PN code used in the detection frame 41 may encapsulate timestamp data corresponding to the time of transmission of the mixed signal by the detection and communication module 1. Thus, this time, when the mixed signal is received by the detection and communication module 4, the detection frame 41 is no longer ignored but decoded, and the timestamp data is recovered. The timestamp data is then compared to local timestamp data corresponding to the time of receipt of the mixed signal by the detection and communication module 4, thereby determining a transmission time taken for the mixed signal to travel between the detection and communication module 1 and the detection and communication module 4. A similar process can also be used from the detection and communication module 4 to the detection and communication module 1. This allows the different equipment present in the network to know their relative distances.

Figure 5:
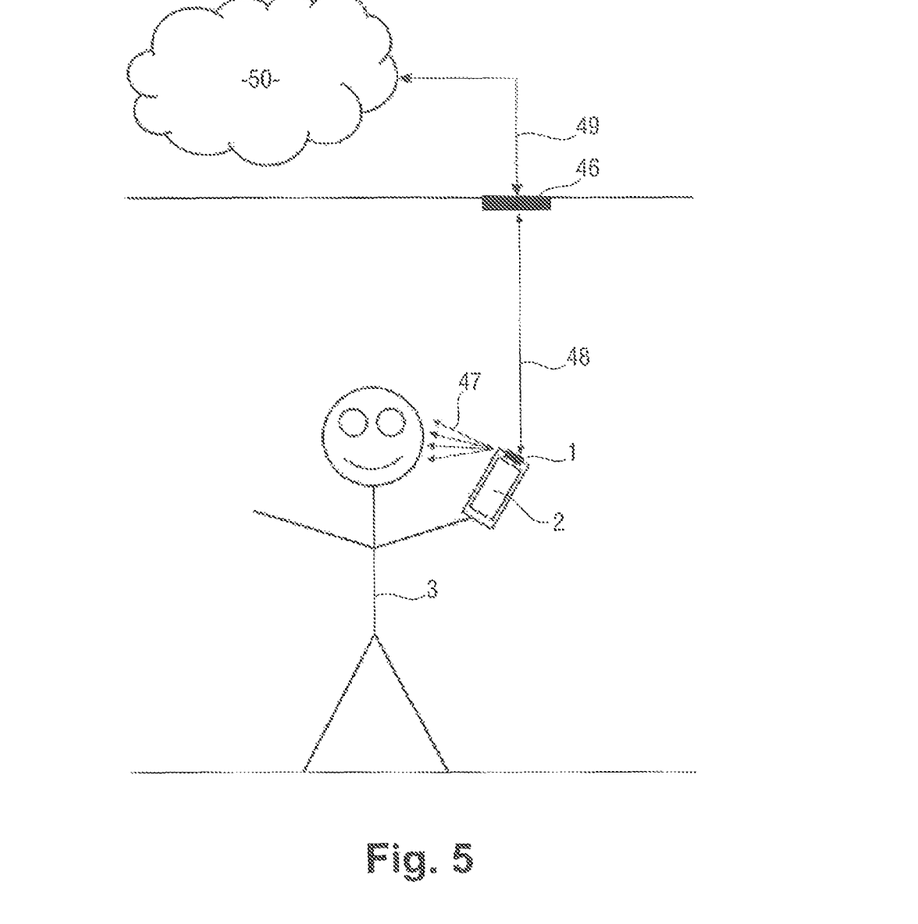
FIG. 5 shows an individual with a smartphone equipped with a detection and communication module according to the invention, the smartphone being connected to a LiFi network via the detection and communication module according to the invention and via a LiFi access point.

With reference to FIG. 5, the optical wireless communication function could also be used to connect the smartphone 2 to a LiFi network via a LiFi access point 46.

In this case, the detection and communication module 1 of the smartphone 2 of individual 3 sends, on the one hand, detection light beams 47 to perform facial recognition, as described earlier, and on the other hand, communication light beams 48 to the LiFi access point 46. The detection light beams 47 and the communication light beams 48 are sent simultaneously (thus forming global light beams as in the third mode of operation previously described) or separately.

The LiFi access point 46 is itself connected by an optical fiber or electrical cable 49 to a local or public network 50 such as the Internet.

Thus, a detection and communication module according to a first embodiment of the invention has been described, which is arranged to implement a facial recognition function and a optical wireless communication function.

In a second embodiment of the invention, the face detection function is this time an eye protection function. The detection and communication module according to the second embodiment of the invention is thus arranged to implement an eye protection function and an optical wireless communication function. The detection and communication module according to the second embodiment of the invention is here similar, at the hardware level, to the detection and communication module according to the first embodiment of the invention 1.

The main function is the optical wireless communication function: the detection and communication module, as already described, transmits via the transmission chain 22 a transmitted optical wireless communication signal containing data to be transmitted, and receives via the reception chain 23 a received optical wireless communication signal.

At regular intervals, the processing unit 12 transmits via the transmission chain 22 a detection signal. When an obstacle is in the vicinity of the detection and communication module, for example a surface of the face of an individual holding a smartphone in which the detection and communication module is integrated, the processing unit 12 receives via the reception chain 23 the detection signal following its reflection against said obstacle.

The processing unit 12 then evaluates a distance between the detection and communication module and said obstacle.

As long as the distance between the detection and communication module and the obstacle remains greater than or equal to a predefined threshold, the processing unit 12 continues to transmit the optical wireless communication signal.

When the distance between the detection and communication module and the obstacle falls below the predefined threshold, the processing unit 12 stops the transmission of the transmitted wireless optical communication signal and thus interrupts the transmission of the communication light beams.

This eye protection function allows to protect the eyes of the individual when he approaches the light source of the detection and communication module too close to his eyes. The photo-biological risks linked to the use of optical wireless communication are therefore controlled.

The implementation of this eye protection function allows for a safe increase in the transmitting power used to transmit the transmitted optical wireless communication signal, for example by using a light source comprising a vertical-cavity surface-emitting laser diode (VCSEL). This improves the range and quality of the optical wireless communication.

The transmission of the communication light beams is therefore cut off as soon as the processing unit detects an obstacle that is too close, regardless of the obstacle. It would be possible to implement an eye protection function which would detect that the obstacle is indeed a face, or even that the obstacle is indeed an eye, for example by implementing face shape recognition processings. The eye protection function is then close to the face recognition function.

We also note that the three functions can be perfectly implemented in the same detection and communication module.

For example, the eye protection function can be triggered as soon as an optical wireless communication starts, to ensure the safety of the individual. The facial recognition function is triggered as soon as the individual attempts to authenticate themselves. When the facial recognition function is triggered and the processing unit detects that an obstacle (either any obstacle, or a face, or an eye) is too close, the processing unit stops the facial recognition.

Of course, the invention is not limited to the described embodiment but encompasses any variant falling within the scope of the invention as defined by the claims.

It has been indicated here that the light source of the detection and communication module includes a LED. The light source could be different and for example include a resonant cavity LED or a VCSEL. Of course, the light source could include several similar components, such as several LEDs, or several different components, such as one or more LEDs and one or more vertical cavity surface emitting laser diodes.

Similarly, the photoreceptor could be different and include one or more PIN photodiodes, one or more avalanche photodiodes, or a single-photon avalanche diode or single-photon avalanche diode array.

Similarly, the transmitting optical device is not necessarily a diverging lens but could include a converging lens or a freeform lens.

Similarly, the receiving optical device is not necessarily a converging lens but could include a freeform lens or an optical concentrator.

It has been described that the detection and communication module is integrated in a smartphone, but it can of course be integrated in a different piece of equipment, for example in a tablet.

The invention claimed is:

1. A detection and communication module arranged to implement a face detection function and an optical wireless communication function, and comprising a processing unit, a transmission chain comprising a transmission analog front-end circuit and a light source, and a reception chain comprising a reception analog front-end circuit and a photoreceiver, the processing unit being arranged to transmit via the transmission chain a detection signal, to receive via the reception chain the detection signal following its reflection on a surface of the face of an individual, to measure a time of flight of the detection signal, and to evaluate a distance between the detection and communication module and the surface of the face of the individual, the processing unit being further arranged to transmit via the transmission chain a transmitted optical wireless communication signal containing data to be transmitted, and to receive via the reception chain a received optical wireless communication signal, wherein the detection signal and the transmitted optical wireless communication signal are included in a single mixed signal that comprises packets each comprising a detection frame, a communication preamble, and a communication frame comprising the data to be transmitted, wherein the detection frame comprises a binary signal having high autocorrelation and comprising a pseudo-random noise code, and wherein the optical wireless communication function is used to define the pseudo-random noise code assigned to the detection and communication module.

2. The detection and communication module according to claim 1, wherein the face detection function is a facial recognition function.

3. The detection and communication module according to claim 1, wherein the face detection function is an eye protection function, and wherein the processing unit is arranged to interrupt transmission of the transmitted optical wireless communication signal when the distance between the detection and communication module and the surface of the individual's face is below a predefined threshold.

4. The detection and communication module according to claim 1, wherein the detection frame incorporates timestamp data for calculating, by another detection and communication module receiving the mixed signal, a transmission time of the mixed signal from the detection and communication module to said other detection and communication module.

5. The detection and communication module according to claim 1, wherein the transmission analog front-end circuit and the reception analog front-end circuit are integrated in a single electronic component.

6. The detection and communication module according to claim 1, wherein the detection and communication module is integrated into a single optoelectronic component.

7. The detection and communication module according to claim 1, further comprising an optical transmission device at an output of the transmission chain.

8. The detection and communication module according to claim 7, wherein the optical transmission device comprises a first converging lens or a diverging lens or a first freeform lens.

9. The detection and communication module according to claim 1, further comprising an optical reception device at the input of the reception chain.

10. The detection and communication module according to claim 9, wherein the optical reception device comprises a second converging lens or a second freeform lens or an optical concentrator.

11. The detection and communication module according to claim 1, wherein the light source comprises a LED or a resonant cavity LED or a vertical cavity laser diode emitting through the surface.

12. The detection and communication module according to claim 1, wherein the photoreceiver comprises a PIN photodiode or an avalanche photodiode or a single photon avalanche diode.

13. An equipment wherein a detection and communication module according to claim 1 is integrated.

14. The equipment according to claim 13, wherein the equipment is a smartphone or tablet.

* * * * *